US012654510B2

(12) United States Patent
Denoual et al.

(10) Patent No.: US 12,654,510 B2
(45) Date of Patent: Jun. 16, 2026

(54) HEAT-TREATMENT MODULE FOR A VEHICLE HEAT-TREATMENT SYSTEM

(71) Applicant: VALEO SYSTEMES THERMIQUES, Le Mesnil-Saint-Denis (FR)

(72) Inventors: Christophe Denoual, Le Mesnil-Saint-Denis Cedex (FR); Frederic Tison, Le Mesnil-Saint-Denis Cedex (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 115 days.

(21) Appl. No.: 18/699,198

(22) PCT Filed: Oct. 5, 2022

(86) PCT No.: PCT/EP2022/077726
§ 371 (c)(1),
(2) Date: Apr. 5, 2024

(87) PCT Pub. No.: WO2023/057524
PCT Pub. Date: Apr. 13, 2023

(65) Prior Publication Data
US 2024/0399821 A1 Dec. 5, 2024

(30) Foreign Application Priority Data

Oct. 6, 2021 (FR) ...................................... 2110592

(51) Int. Cl.
*B60H 1/00* (2006.01)
*F28D 9/00* (2006.01)
(Continued)

(52) U.S. Cl.
CPC ......... *B60H 1/00328* (2013.01); *F28D 9/005* (2013.01); *F28D 9/0056* (2013.01);
(Continued)

(58) Field of Classification Search
CPC ................. B60H 1/00328; F28D 9/005; F28D 9/0056; F28D 9/0093; F28D 2021/008; F28F 9/0253
See application file for complete search history.

(56) References Cited

U.S. PATENT DOCUMENTS 8,443,869 B2 * 5/2013 Lavanchy ................. F28B 1/02
165/145
8,899,062 B2 12/2014 Kadle et al.
(Continued)

FOREIGN PATENT DOCUMENTS

DE 102016207763 B4 * 1/2022 ............. F28F 27/02
DE 102021210864 A1 * 3/2023 ............. F28F 9/26
(Continued)

OTHER PUBLICATIONS

International Search Report Issued in Corresponding PCT Application No. PCT/EP2022/077726, dated Jan. 17, 2023. (5 Pages with English Translation).
(Continued)

*Primary Examiner* — Ljiljana V. Ciric
(74) *Attorney, Agent, or Firm* — Osha Bergman Watanabe & Burton LLP

(57) ABSTRACT

Described is a thermal treatment module for a thermal treatment system of a vehicle. The thermal treatment module includes a heat exchanger and an internal heat exchanger. The heat exchanger brings about an exchange of heat between a heat transfer liquid and a refrigerant fluid. The internal heat exchanger brings about an exchange of heat between the refrigerant fluid subjected to two different temperature levels in the thermal treatment system. The thermal treatment module includes an attachment block secured to the heat exchanger and bearing an expansion
(Continued)

Figure 1:
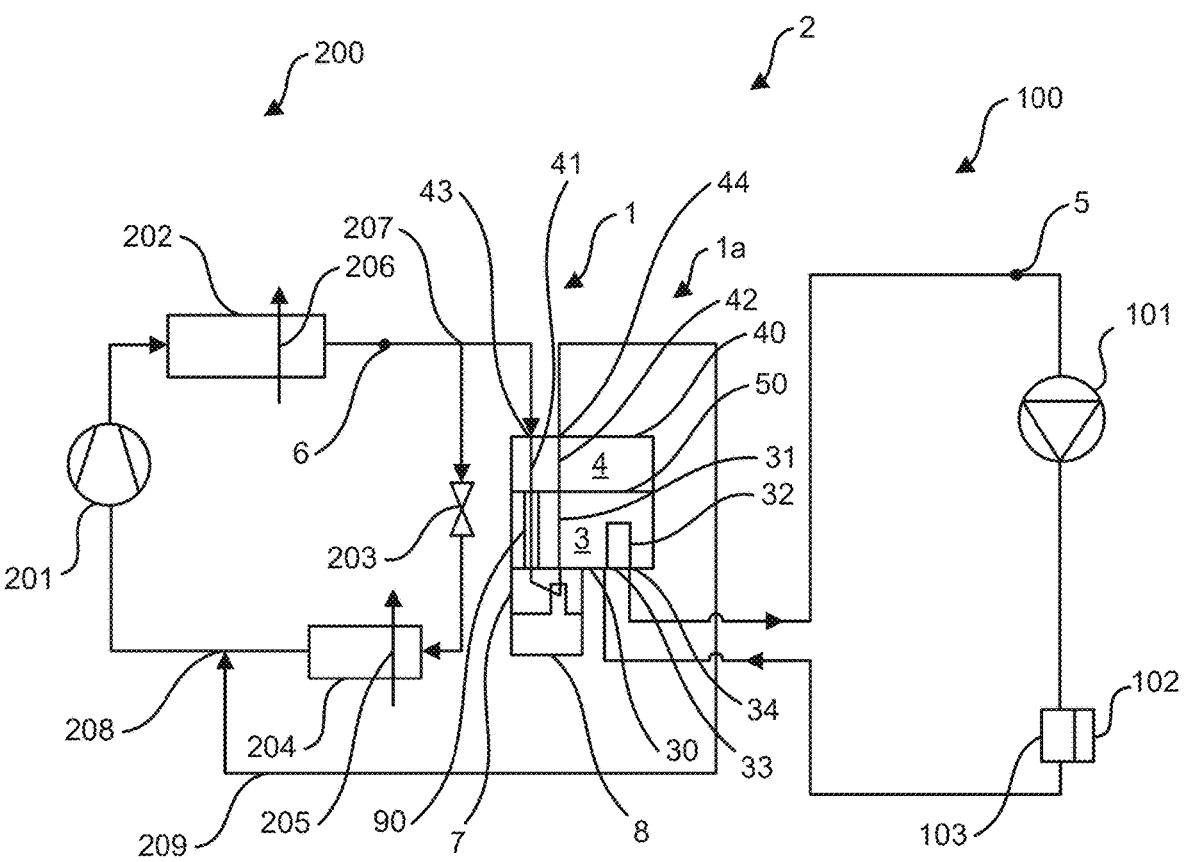

member. The heat exchanger is interposed between the internal heat exchanger and the attachment block.

9 Claims, 15 Drawing Sheets

(51) Int. Cl.
    *F28D 21/00*           (2006.01)
    *F28F 9/02*           (2006.01)

(52) U.S. Cl.
    CPC .......... *F28D 9/0093* (2013.01); *F28F 9/0253* (2013.01); *F28D 2021/008* (2013.01)

(56) References Cited

U.S. PATENT DOCUMENTS

| | | | | |
|---|---|---|---|---|
| 9,109,840 | B2 * | 8/2015 | Kadle ................. | B60H 1/32284 |
| 10,618,372 | B2 * | 4/2020 | Kim ........................ | F28F 9/002 |
| 11,655,896 | B2 * | 5/2023 | Welch ..................... | F24F 5/001 |
| | | | | 62/498 |
| 12,325,285 | B2 * | 6/2025 | Shin .......................... | F28F 3/08 |
| 2012/0210746 | A1 * | 8/2012 | Kadle ................. | B60H 1/32284 |
| | | | | 165/166 |
| 2012/0216562 | A1 * | 8/2012 | Kadle .................. | F28D 9/0093 |
| | | | | 62/434 |
| 2013/0269910 | A1 * | 10/2013 | De Piero .............. | F28D 9/0037 |
| | | | | 165/104.11 |
| 2013/0283838 | A1 * | 10/2013 | Kadle .................. | F28D 9/0093 |
| | | | | 62/509 |
| 2023/0102168 | A1 * | 3/2023 | Behnert .................... | F28F 3/08 |
| | | | | 165/42 |
| 2023/0311612 | A1 * | 10/2023 | Denoual ........... | B60H 1/00807 |
| | | | | 165/167 |
| 2024/0003638 | A1 * | 1/2024 | Lee ........................ | F28D 9/0043 |
| 2024/0367479 | A1 * | 11/2024 | Tissot ................... | F25B 39/022 |
| 2024/0399821 | A1 * | 12/2024 | Denoual ................. | F28D 9/005 |

FOREIGN PATENT DOCUMENTS

| | | | | | |
|---|---|---|---|---|---|
| DE | 102018110370 | B4 * | 6/2023 | .............. | F28F 3/044 |
| DE | 102023117005 | A1 * | 1/2024 | ................ | F28F 3/08 |
| DE | 102012113213 | B4 * | 3/2024 | ............ | F28F 27/02 |
| DE | 102023126085 | A1 * | 8/2024 | ........... | B60H 1/3229 |
| EP | 1896789 | B1 * | 10/2008 | ................ | F28F 9/26 |
| EP | 2629032 | A2 | 8/2013 | | |
| EP | 2650634 | A1 * | 10/2013 | .......... | B01D 53/265 |
| EP | 3540352 | A1 | 9/2019 | | |
| EP | 4459747 | A1 * | 11/2024 | ............. | F25B 41/31 |
| FR | 2916835 | A1 * | 12/2008 | ........... | F25B 39/022 |
| FR | 3144862 | A1 * | 7/2024 | ............. | F28F 27/02 |
| IT | 202100002951 | A1 * | 8/2022 | ........... | F28F 9/0246 |
| WO | WO-2021084189 | A1 * | 5/2021 | ........... | F28D 9/0093 |
| WO | WO-2022245155 | A1 * | 11/2022 | .......... | F28D 9/0093 |
| WO | WO-2024149629 | A1 * | 7/2024 | ............. | F28F 27/02 |

OTHER PUBLICATIONS

Written Opinion of the International Research Administration Issued in Corresponding PCT Application No. PCT/EP2022/077726, dated Jan. 17, 2023. (4 Pages).

* cited by examiner

HEAT-TREATMENT MODULE FOR A VEHICLE HEAT-TREATMENT SYSTEM

The field of the present invention is that of thermal treatment modules for a thermal treatment system of an electric or hybrid vehicle. The invention relates to such a thermal treatment module. It also relates to a thermal treatment device comprising such a thermal treatment module and an expansion member. It furthermore relates to a thermal treatment system comprising such a thermal treatment device.

Electric or hybrid vehicles are equipped with an electric motor in order to allow them to move. The electric motor is supplied with electrical energy by an electrical storage device, such as a battery, which tends to heat up during operation. To continue operation of the electrical storage device, it is desirable to cool it down. To this end, the electric or hybrid vehicle is equipped with a thermal treatment system which comprises a heat-transfer liquid circuit within which a heat transfer liquid circulates and a refrigerant fluid circuit within which a refrigerant fluid circulates. The thermal treatment system comprises a heat exchanger which is designed to enable an exchange of heat between the refrigerant fluid present inside the heat exchanger and the heat transfer liquid present inside the heat exchanger. The heat-transfer liquid circuit also comprises a pump and a heat exchanger designed to exchange heat with the electrical storage device. The refrigerant fluid circuit also comprises a compressor, a condenser, at least one expansion member and an evaporator.

Such a thermal treatment system has proven to be bulky and requires numerous pipes to connect the elements of the thermal treatment system to one another, notably the constituent elements of the refrigerant fluid circuit. These pipes are liable to create leaks of heat transfer liquid from the heat-transfer liquid circuit and/or leaks of refrigerant fluid from the refrigerant fluid circuit. In addition, these pipes are where dissipations of heat occur, which adversely affect the overall performance of the thermal treatment system. Lastly, these pipes cause the expenditure of too much time on assembling the elements of the heat-transfer liquid circuit and of the refrigerant fluid circuit with one another.

The present invention falls within this context and proposes a thermal treatment module for a thermal treatment system of a vehicle, such as an electric or hybrid vehicle. The thermal treatment module comprises a heat exchanger and an internal heat exchanger. The heat exchanger is configured to bring about an exchange of heat between a heat transfer liquid and a refrigerant fluid. The internal heat exchanger is configured to bring about an exchange of heat between the refrigerant fluid subjected to two different temperature levels in the thermal treatment system.

According to the present invention, the thermal treatment module comprises an attachment block at least secured to the heat exchanger and designed to bear an expansion member, the heat exchanger being interposed between the internal heat exchanger and the attachment block.

The thermal treatment module advantageously comprises at least any one of the following technical features, taken individually or in combination:
  the thermal treatment module is a unitary thermal treatment module forming a one-piece assembly comprising the internal heat exchanger, the heat exchanger and the attachment block, which can only be separated from one another via deterioration, or even destruction, of at least one of them. The thermal treatment module thus forms an assembly which is in one piece, the attachment block is a parallelepipedal overall block and the attachment block has at least one chamber and at least two channels, namely a first channel which extends between a first inlet orifice and a first outlet orifice which opens onto the chamber, and a second channel which extends between a second inlet orifice which opens onto the chamber and a second outlet orifice,
  the first inlet orifice and the second outlet orifice are formed on a first face of the attachment block which is in contact with an end plate of the heat exchanger,
  the first face is brazed to the end plate of the heat exchanger,
  the chamber leads onto a second face of the attachment block, opposite the first face of the attachment block,
  the second face is parallel to the first face,
  the second face is equipped with means for attaching the expansion member,
  the attachment means are means of attachment by screwing or the like,
  the heat exchanger comprises a means for conveying the refrigerant fluid which extends between the end plate of the heat exchanger and a dividing plate interposed between the heat exchanger and the internal heat exchanger, the conveying means forms a bypass of the heat exchanger to directly channel a circulation of the refrigerant fluid at high pressure circulating within the internal heat exchanger to the attachment block, while minimizing the exchanges of heat between the refrigerant fluid circulating within the conveying means and the heat transfer liquid and/or the refrigerant fluid circulating within the heat exchanger,
  the conveying means comprises an inlet opening in fluidic communication with a first circulation pathway of the refrigerant fluid at a first temperature that the internal heat exchanger has and an outlet opening in fluidic communication with the first inlet orifice of the attachment block. The first circulation pathway channels a circulation of the refrigerant fluid at high pressure,
  the heat exchanger comprises a first pass, which is configured to be flowed through by the refrigerant fluid and extends between a first intake orifice in fluidic communication with the second outlet orifice of the attachment block and a first discharge orifice formed the dividing plate, and a second pass, which is configured to be flowed through by the heat transfer liquid and extends between an intake opening through which heat transfer liquid is admitted to the heat exchanger and a discharge opening for discharging heat transfer liquid from the heat exchanger,
  the internal heat exchanger comprises a second circulation pathway of the refrigerant fluid at a second temperature which is configured to enable an exchange of heat with the first circulation pathway of the refrigerant fluid at a first temperature and extends between a second intake orifice in fluidic communication with the first discharge orifice and a discharge opening for discharging refrigerant fluid from the internal heat exchanger, the first circulation pathway extending between an intake opening for admitting refrigerant fluid and a second discharge orifice in fluidic communication with the inlet opening of the conveying means,
  the first circulation pathway and the second circulation pathway are arranged in a U shape, inside a circulation plane which is parallel to a plate plane in which either the end plate of the heat exchanger, an end plate of the internal heat exchanger or the dividing plate extends, the first circulation pathway and the second circulation pathway are arranged in an X shape, inside said circulation plane, the first pass and the second pass are arranged in a U shape, inside said circulation plane, the first pass and the second pass are arranged in an X shape, inside said circulation plane, the thermal treatment module comprises a plurality of plates, including the end plate of the heat exchanger and an end plate of the internal exchanger, which is provided with the intake opening for admitting refrigerant fluid and the discharge opening for discharging refrigerant fluid, between which are interposed the dividing plate and exchanger plates which are stacked one on top of another, each plate being arranged in a pan delimited by a raised peripheral rim which borders a bottom, the bottoms of the exchanger plates and of the dividing plate having a plurality of flanges at least partially delimiting a passage for heat transfer liquid or heat transfer fluid, the raised peripheral edges of two successive plates being brazed to one another, the bottoms of the exchanger plates of the heat exchanger are provided with at least one groove for conferring a U shape on the passes that the heat exchanger accommodates, the bottoms of the exchanger plates of the heat exchanger are provided with a plurality of flow-disturbing elements for disturbing a laminar flow of the refrigerant fluid and/or of the heat transfer liquid, in order to optimize an exchange of heat between them, the conveying means is formed by a stack of conveying flanges which are made in one piece with constituent exchanger plates of the heat exchanger, two successive conveying flanges of the stack of conveying flanges are brazed to one another to form the conveying means, the conveying means comprises a tube which passes in succession through the constituent exchanger plates of the heat exchanger, the tube is accommodated inside a header of the heat exchanger, this header is a header within which either the refrigerant fluid or the heat transfer liquid circulates, the tube has an outer surface which is brazed to the dividing plate and to the end plate of the heat exchanger.

The present invention also relates to a thermal treatment device comprising such a thermal treatment module and an expansion member fitted to the attachment block via attachment means.

With preference, the chamber at least partially accommodates an end piece of the expansion member having an inlet opening for refrigerant fluid at high pressure which communicates with the chamber of the attachment block, the end piece having an outlet opening for refrigerant fluid at low pressure in fluidic communication with the second inlet orifice of the attachment block.

The present invention also relates to a thermal treatment system of a vehicle, comprising such a thermal treatment device, the thermal treatment system comprising a heat-transfer liquid circuit within which the heat transfer liquid circulates, the heat-transfer liquid circuit having at least one pump and one heat exchanger designed to exchange heat with an electrical energy storage device, the thermal treatment system comprising a refrigerant fluid circuit within which the refrigerant fluid circulates, the refrigerant fluid circuit having at least one compressor, one condenser, one expansion device and one evaporator.

The present invention also relates to a method for producing such a unitary thermal treatment module, the method comprising at least one step of stamping a metal strip to form plates and forming at least the peripheral rim, the flanges, the groove and the flow-disturbing elements.

The method advantageously comprises a single step of brazing the constituent plates of the heat exchanger, of the internal heat exchanger and of the attachment block, this brazing step being followed by a step of attaching the expansion member to the attachment block.

Figure 2:
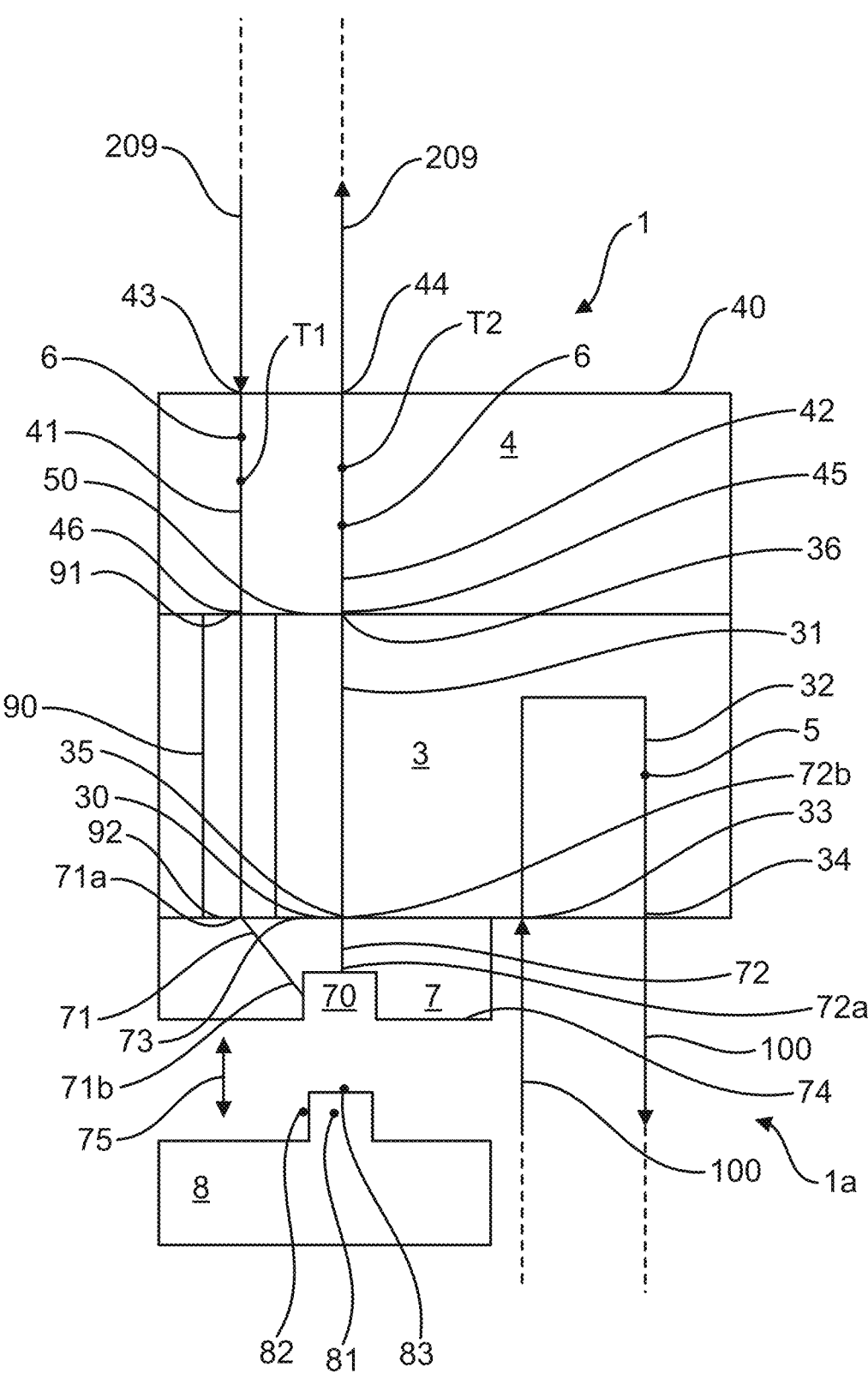
Figure 3:
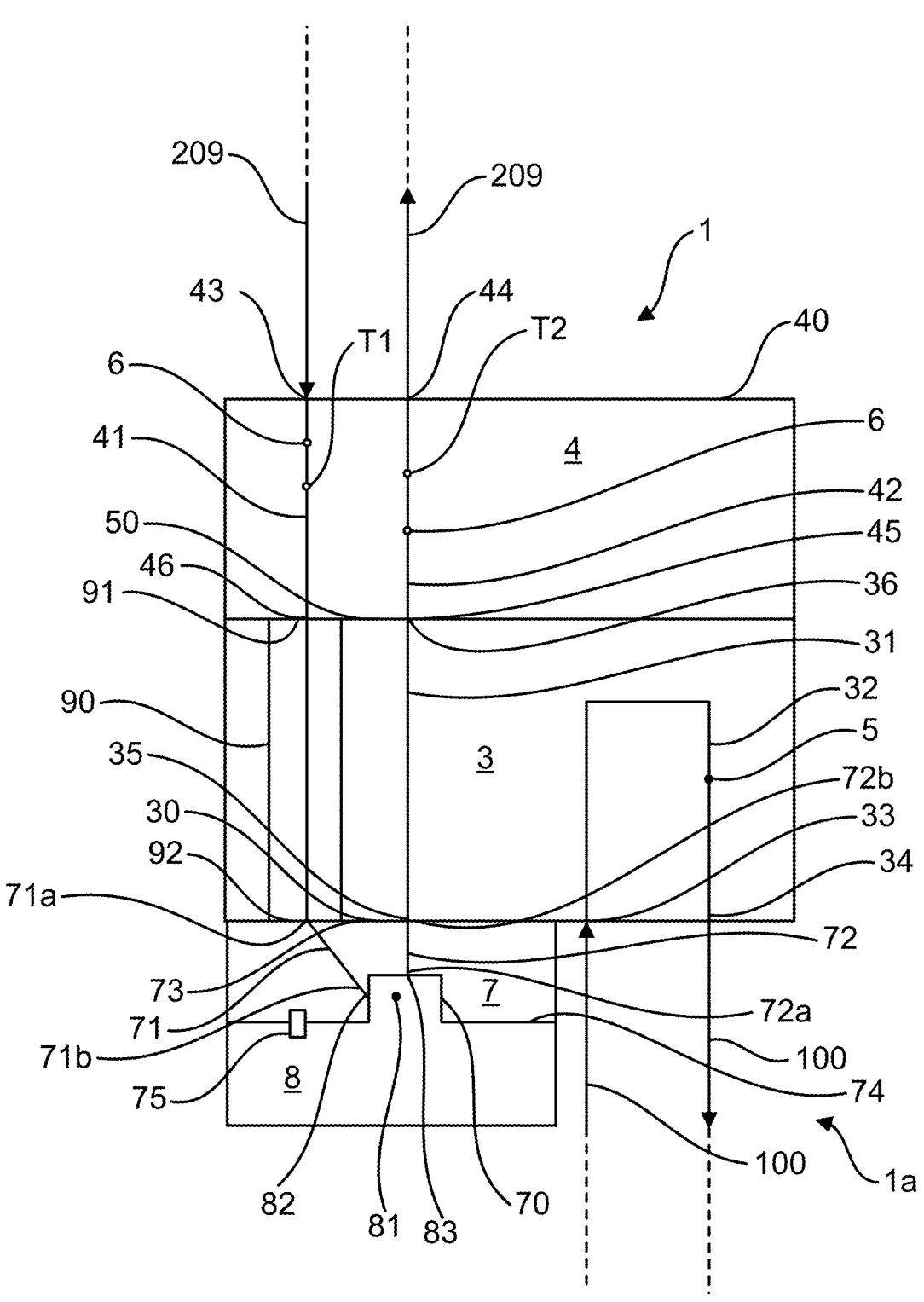
Figure 4:
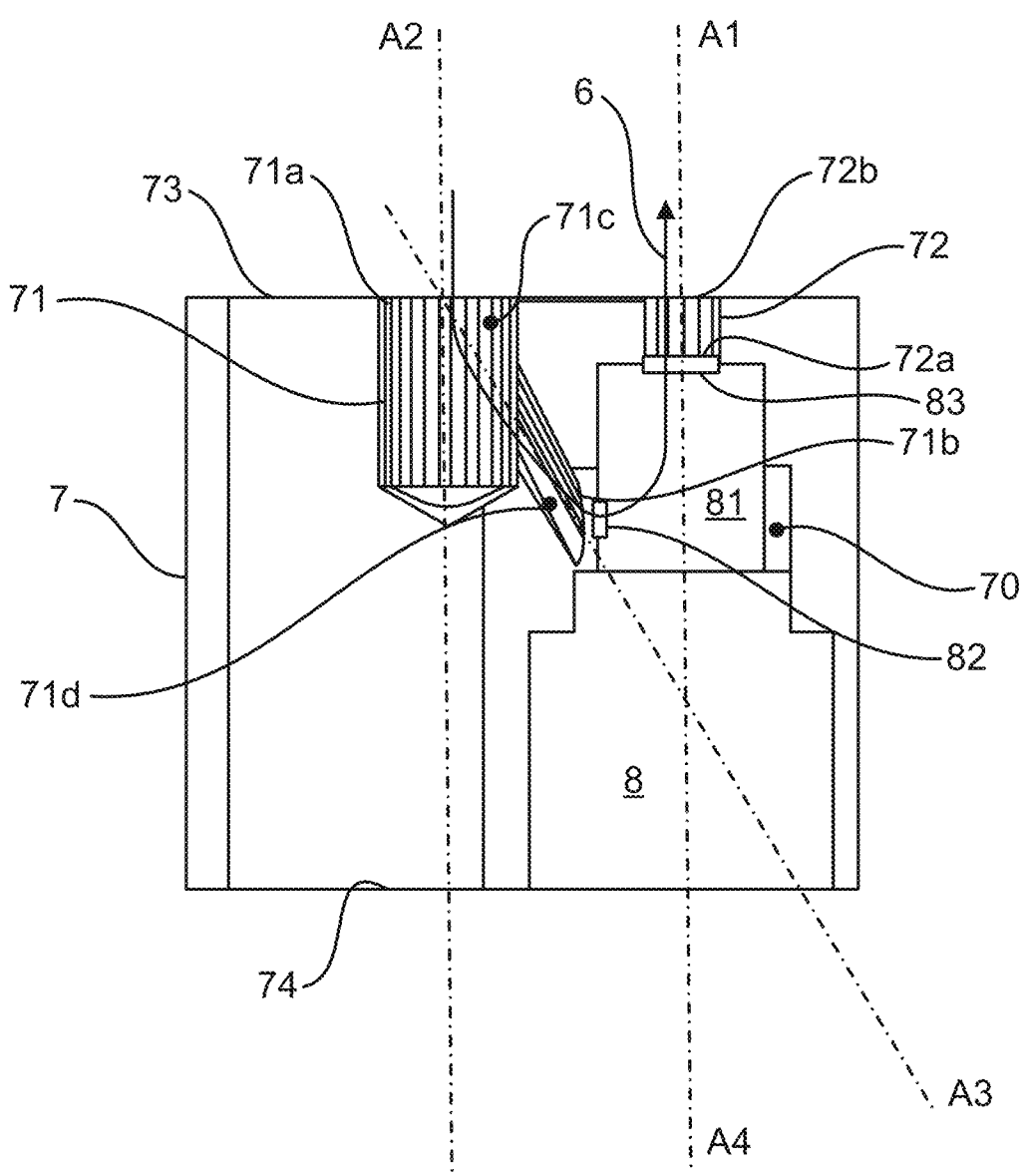
Figure 5:
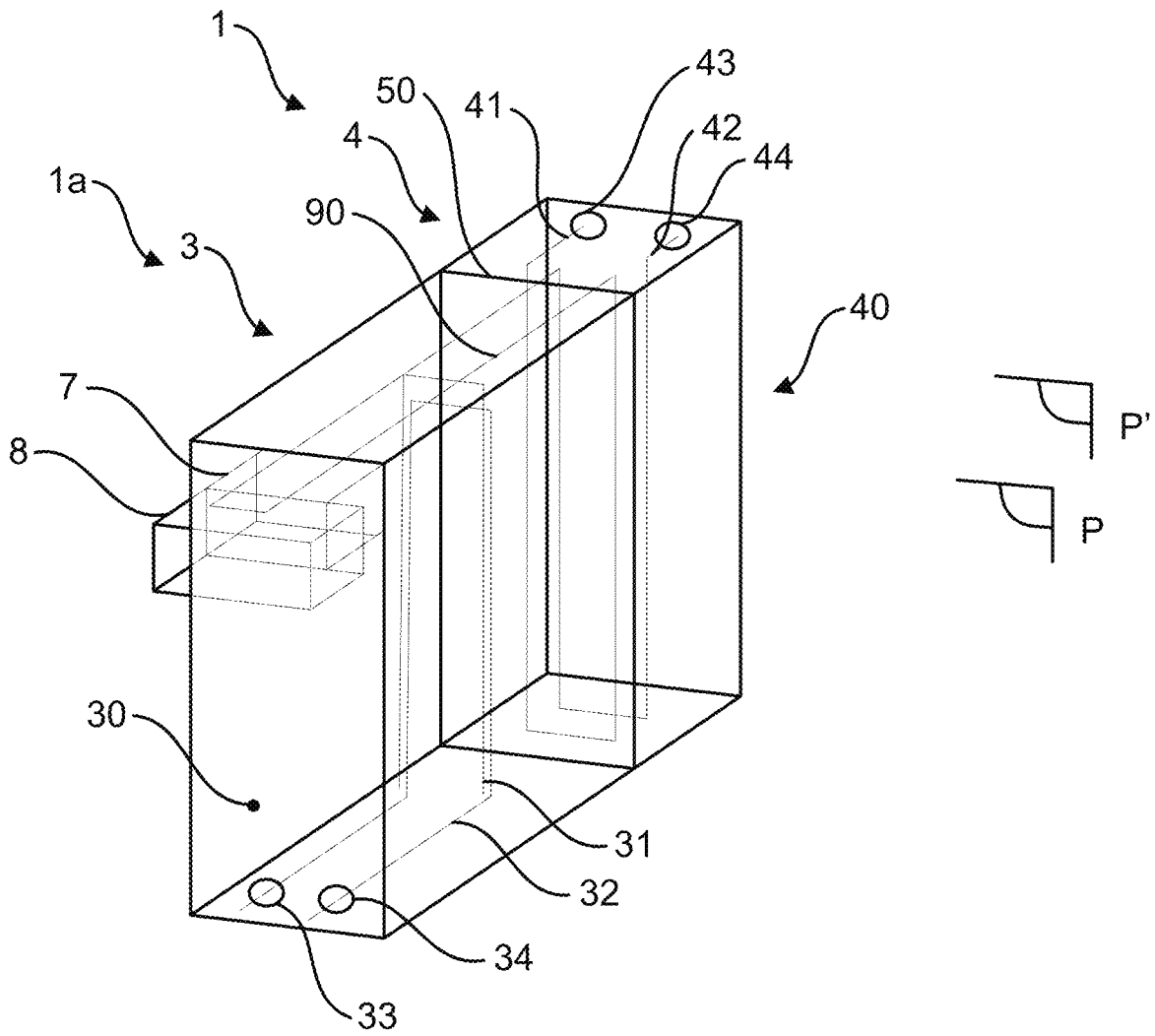
Figure 6:
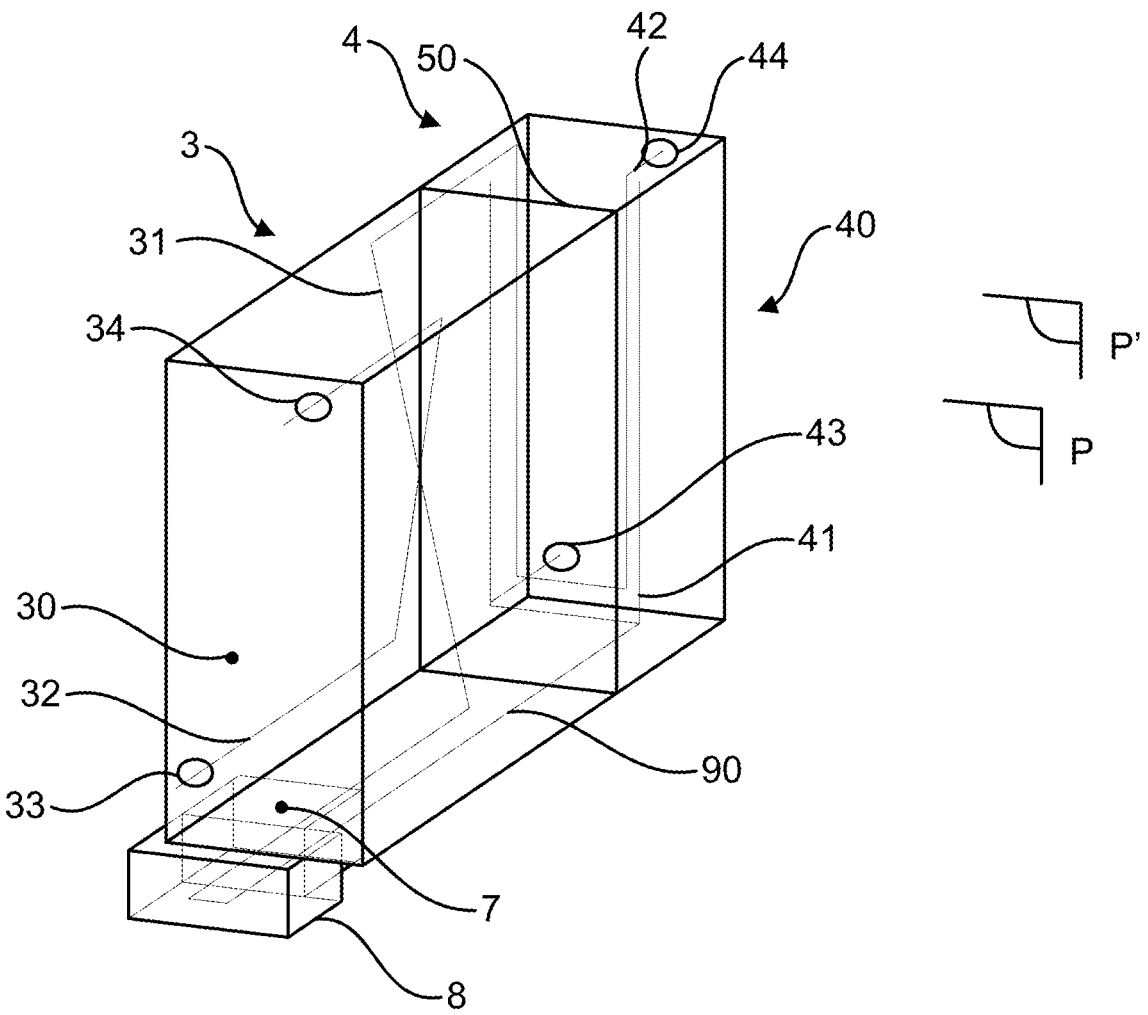
Figure 7:
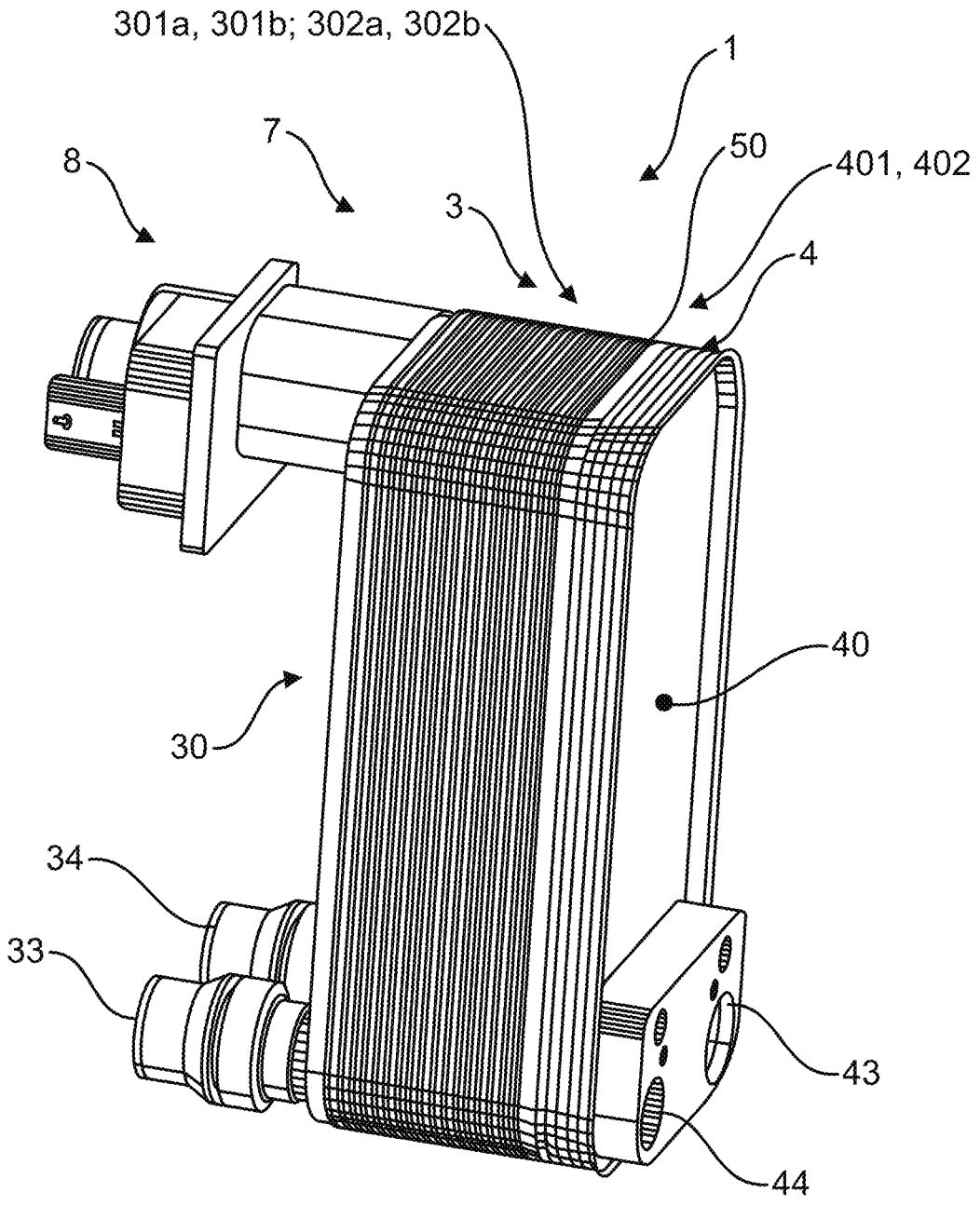

Other features and advantages of the invention will also become apparent from both the following description and from several exemplary embodiments given by way of non-limiting indication with reference to the attached schematic drawings, in which:

FIG. 1 is a schematic illustration of a thermal treatment system according to the present invention, FIG. 2 is a schematic illustration of a thermal treatment module and of an expansion member according to the present invention which are constituent parts of the thermal treatment system shown in FIG. 1, FIG. 3 is a schematic illustration of a thermal treatment device comprising the thermal treatment module and the expansion member illustrated in FIG. 2, FIG. 4 is a sectional schematic view of an attachment block and an expansion member which are constituent parts of the thermal treatment device shown in FIG. 3, FIG. 5 is a schematic illustration of the thermal treatment device according to a first embodiment of a constituent heat exchanger of the thermal treatment device shown in FIG. 3, FIG. 6 is a schematic illustration of the thermal treatment device according to a second embodiment of the constituent heat exchanger of the thermal treatment device shown in FIG. 3, FIG. 7 is a perspective view of the thermal treatment device shown in FIGS. 3, 5 and 6, FIG. 8 is a front view of a constituent dividing plate of the thermal treatment device shown in FIGS. 3 and 5 to 7, FIG. 9 is a front view of a constituent internal heat exchanger plate, of the first type, of the thermal treatment device shown in FIGS. 3 and 5 to 7, FIG. 10 is a front view of a constituent internal heat exchanger plate, of the second type, of the thermal treatment device shown in FIGS. 3 and 5 to 7, FIG. 11 is a front view of a constituent heat exchanger plate, of the first type, of the thermal treatment device shown in FIGS. 3 and 5 to 7, FIG. 12 is a front view of a constituent heat exchanger plate, of the second type, of the thermal treatment device shown in FIGS. 3 and 5 to 7, FIG. 13 is a front view of a constituent heat exchanger plate, of the third type, of the thermal treatment device shown in FIGS. 3 and 5 to 7, FIG. 14 is a front view of a constituent heat exchanger plate, of the third type, of the thermal treatment device shown in FIGS. 3 and 5 to 7, FIG. 15 is an exploded perspective view of the thermal treatment device shown in FIGS. 3 and 5 to 7.

In FIG. 1, an electric or hybrid vehicle is equipped with a thermal treatment system 2 for cooling an electrical storage device 102 capable of supplying electrical energy to an electric motor of the electric or hybrid vehicle. The electric motor is also able to set the electric or hybrid vehicle in motion. The thermal treatment system 2 is also intended for cooling a stream of internal air 205 prior to delivering the stream of internal air 205 into an electric or hybrid vehicle interior.

For this, the thermal treatment system 2 comprises a heat-transfer liquid circuit 100 within which a heat transfer liquid 5, such as glycol water or the like, circulates. The thermal treatment system 2 also comprises a refrigerant fluid circuit 200 within which a refrigerant fluid 6, such as R134a, R1234yf, R744 or the like circulates.

The heat-transfer liquid circuit 100 comprises a pump 101 for making the heat transfer liquid 5 circulate within the heat-transfer liquid circuit 100. The heat-transfer liquid circuit 100 also comprises a heat exchanger 103, which is designed to allow the heat transfer liquid 5 present inside the heat exchanger 103 to exchange heat with the electrical storage device 102. The heat-transfer liquid circuit 100 also comprises a heat exchanger 3 which is designed to enable a transfer of heat between the heat transfer liquid 5 present inside the heat exchanger 3 and the refrigerant fluid 6 also present inside the heat exchanger 3. To this end, the heat exchanger 3 comprises a first pass 31, which is configured to be flowed through by the refrigerant fluid 6, and a second pass 32, which is configured to be flowed through by the heat transfer liquid 5. The first pass 31 and the second pass 32 are mutually arranged to bring about an exchange of heat between the refrigerant fluid 6 present inside the first pass 31 and the heat transfer liquid 5 present inside the second pass 32. The second pass 32 extends between an intake opening 33 for admitting heat transfer liquid to the heat exchanger 3 and a discharge opening 34 for discharging heat transfer liquid from the heat exchanger 3. The intake opening 33 for admitting heat transfer liquid and the discharge opening 34 for discharging heat transfer liquid belong to an end plate 30 of the heat exchanger 3.

Within the heat-transfer liquid circuit 100, the heat transfer liquid 5 circulates from the pump 101 to the heat exchanger 103 to collect heat at the electrical storage device 102, then enters the heat exchanger 3 via the intake opening 33 for admitting heat transfer liquid, then circulates within the second pass 32 of the heat exchanger 3 to give up heat to the refrigerant fluid 6 present inside the first pass 31, then reaches the discharge opening 34 for discharging heat transfer liquid from the heat exchanger 3, and then the heat transfer fluid 5 returns to the pump 101.

The refrigerant fluid circuit 200 comprises a compressor 201 for compressing the refrigerant fluid 5 to a high pressure, a condenser 202 for allowing the refrigerant fluid 5 present inside the condenser 202 to give up heat, at a constant pressure, to a stream of external air 206 passing through the condenser 202, an expansion device 203 within which the refrigerant fluid 5 undergoes expansion and transitions from high pressure to low pressure, and an evaporator 204 designed to cool down the stream of internal air 205.

The refrigerant fluid circuit 200 also comprises a bypass branch 209, which extends between a divergence point 207 disposed between an outlet of the condenser 202 and an inlet of the expansion device 203, and a convergence point 208 positioned between an outlet of the evaporator 204 and an inlet of the compressor 201. The bypass branch 209 comprises an internal heat exchanger 4, the heat exchanger 3, an expansion member 8 and an attachment block 7 for attaching the expansion member 8 to the end plate 30 of the heat exchanger 3.

With reference also to FIGS. 2 and 3, the present invention proposes a thermal treatment module 1 which is unitary and brings together, in a single inseparable assembly, the internal heat exchanger 4, the heat exchanger 3 and the attachment block 7. The unitary nature of the thermal treatment module 1 is understood to mean that the internal heat exchanger 4, the heat exchanger 3 and the attachment block 7 cannot be separated from one another without adversely affecting, or even destroying, at least one of the following: the internal heat exchanger 4, the heat exchanger 3 and the attachment block 7. In other words, the internal heat exchanger 4, the heat exchanger 3 and the attachment block 7 form a one-piece assembly. In other words again, there is continuity of material between the internal heat exchanger 4 and the heat exchanger 3, on the one hand, and between the heat exchanger 3 and the attachment block 7, on the other hand.

The present invention also proposes a thermal treatment device 1a which comprises the thermal treatment module 1 and the expansion member 8 which is fitted to the attachment block 7 via attachment means 75, such as means of attachment by screwing, by interlocking or the like.

FIG. 2 shows the thermal treatment module 1 and the expansion member 8 prior to being assembled to form the thermal treatment device 1a, illustrated in FIG. 3. It should be noted at this stage of the description that FIGS. 1 to 3 schematically show the thermal treatment module 1 and the thermal treatment device 1a in order to illustrate their operation.

It will be understood that the thermal treatment module 1 and the thermal treatment device 1a formed in this way provide the thermal treatment system 2 with optimized compactness, minimize the number of pipes present between the constituent elements of the thermal treatment system 2, decrease the dissipation of heat and reduce the time required to assemble the elements with one another.

In the thermal treatment module 1, the heat exchanger 3 is interposed between the internal heat exchanger 4 and the attachment block 7. In the thermal treatment device 1a, the attachment block 7 is interposed between the heat exchanger 3 and the expansion member 8. The internal heat exchanger 4 extends between an end plate 40 of the internal heat exchanger 4 and a dividing plate 50 which delimits the internal heat exchanger 4 and the heat exchanger 3. The end plate 40 is provided with an intake opening 43 for admitting refrigerant fluid to the internal heat exchanger 4 and a discharge opening 44 for discharging refrigerant fluid from the internal heat exchanger 4. For its part, the heat exchanger 3 extends between the dividing plate 50 and the end plate 30.

The internal heat exchanger 4 is configured to bring about an exchange of heat between the refrigerant fluid 6 subjected to two different temperature levels T1, T2, namely a first temperature T1 and a second temperature T2 lower than the first temperature T1, in the thermal treatment system 2, and more particularly in the refrigerant fluid circuit 200. To this end, the internal heat exchanger 4 comprises a first circulation pathway 41 of the refrigerant fluid 6 at the first temperature T1 and a second circulation pathway 42 of the refrigerant fluid 6 at the second temperature T2. The second circulation pathway 42 is designed to enable an exchange of heat between the refrigerant fluid 6 present inside the second circulation pathway 42 and the refrigerant fluid 6 present inside the first circulation pathway 41. The intake opening 43 for admitting refrigerant fluid to the internal heat exchanger 4 makes it possible to admit refrigerant fluid 6 at high pressure to the first circulation pathway 41 and the discharge opening 44 for discharging refrigerant fluid makes it possible to discharge the refrigerant fluid 6 at low pressure from the second circulation pathway 42.

Inside the expansion member 8, and like in the expansion device 203, the refrigerant fluid 6 undergoes expansion and transitions from high pressure to low pressure. The expansion member 8 is preferably an expansion valve. In general, the expansion member 8 has an end piece 81 which is provided with an inlet opening 82 for refrigerant fluid 6 at high pressure and an outlet opening 83 for refrigerant fluid 6 at low pressure. It will be understood that the expansion member 8 is able to make the refrigerant fluid 6 expand between the inlet opening 82 for refrigerant fluid 6 at high pressure and the outlet opening 83 for refrigerant fluid 6 at low pressure.

The attachment block 7 is generally made up of a parallelepipedal block which has two functions, a first function consisting in transiting the refrigerant fluid through it and a second function consisting in bearing the expansion member 8, by accommodating at least the end piece 81 of the latter. To these ends, the attachment block 7 has a chamber 70 intended to at least partially receive the end piece 81 of the expansion member 8. The attachment block 7 also has two channels 71, 72, namely a first channel 71 which extends between a first inlet orifice 71$a$ and a first outlet orifice 71$b$ which opens onto the chamber 70, and a second channel 72 which extends between a second inlet orifice 72$a$ which opens onto the chamber 70 and a second outlet orifice 72$b$.

To make the refrigerant fluid 6 at high pressure circulate from the first circulation pathway 41 to the expansion member 8 in order to undergo expansion from high pressure to low pressure there, the heat exchanger 3 accommodates a conveying means 90 for conveying the refrigerant fluid 6 which extends between the dividing plate 50 and the end plate 30 of the heat exchanger. More particularly, the conveying means 90 is able to transit the refrigerant fluid 6 at high pressure from the first circulation pathway 41 to the first inlet orifice 71$a$ of the attachment block 7. In other words, the conveying means 90 forms a bypass of the heat exchanger 3 to make the refrigerant fluid 6 at high pressure circulate directly from the first circulation pathway 41 to the first inlet orifice 71$a$ of the attachment block 7. To this end, the conveying means 90 comprises an inlet opening 91 in fluidic communication with the first circulation pathway 41 of the refrigerant fluid 6 and an outlet opening 92 in fluidic communication with the first inlet orifice 71$a$ of the attachment block 7.

The refrigerant fluid 6 at high pressure circulates within the first channel 71, reaches the first outlet orifice 71$b$ and leads into the chamber 70. The refrigerant fluid 6 at high pressure enters the expansion member 8 via the inlet opening 82 for refrigerant fluid 6 at high pressure. Then, the refrigerant fluid 6 undergoes expansion inside the expansion member 8. Then, the refrigerant fluid 6 at low pressure leaves the expansion member 8 via the outlet opening 83 for refrigerant fluid 6 at low pressure. The outlet opening 83 is in fluidic communication with the second inlet orifice 72$a$, such that the refrigerant fluid 6 then flows within the second channel 72 to the second outlet orifice 72$b$.

The first pass 31 of the heat exchanger 3 extends between a first intake orifice 35 which is in fluidic communication with the second outlet orifice 72$b$ of the attachment block 7 and a first discharge orifice 36 formed through the dividing plate 50. These dispositions are such that the refrigerant fluid 6 at low pressure coming from the expansion member 8 via the attachment block 7 is able to circulate within the first pass 31 in order there to cool down the heat transfer liquid 5 present inside the second pass 32.

The second circulation pathway 42 extends between a second intake orifice 45, which is in fluidic communication with the first discharge orifice 36 of the heat exchanger 3, and the discharge opening 44 for discharging refrigerant fluid from the internal heat exchanger 4, such that the refrigerant fluid 6 inside the second circulation pathway 42 exchanges heat with the refrigerant fluid 6 present inside the first circulation pathway 41 which extends between the intake opening 43 for admitting refrigerant fluid and a second discharge orifice 46. It should be noted that the dividing plate 50 comprises, for the one part, the second discharge orifice 46 and the inlet opening 91 of the conveying means which are in fluidic communication and, for the other part, the first discharge orifice 36 of the heat exchanger 3 and the second intake orifice 45 of the internal heat exchanger 4 which are also in fluidic communication.

According to one embodiment of the attachment block 7 illustrated in FIG. 4, the chamber 70 and the second channel 72 are coaxial and extend along one and the same first extension axis A1. The first channel 71 comprises a first portion 71$c$ of the first channel 71 which is provided with the first inlet orifice 71$a$ and a second portion 71$d$ of the first channel 71 which is provided with the first outlet orifice 71$b$. The first portion 71$c$ of the first channel 71 extends along a second extension axis A2 which is distinct from the first extension axis A1 and parallel to the first extension axis A1. The second portion 71$d$ of the first channel 71 extends along a third extension axis A3 which intersects the first extension axis A1 and the second extension axis A2.

It will be understood that the refrigerant fluid 6 enters the attachment block 7 via the first inlet orifice 71$a$, flows within the first portion 71$c$ of the first channel 71, then goes to the second portion 71$d$ of the first channel 71 to finally pass through the first outlet orifice 71$b$ and reach the chamber 70. Then, the refrigerant fluid 6 enters the expansion member 8 via the inlet opening 82 for refrigerant fluid 6 at high pressure, and then the refrigerant fluid 6 undergoes expansion inside the expansion member 8. Then, the refrigerant fluid 6 at low pressure leaves the expansion member 8 via the outlet opening 83 for refrigerant fluid 6 at low pressure, which the expansion member 8 comprises. Since the outlet opening 83 is in fluidic communication with the second inlet orifice 72$a$, the refrigerant fluid 6 flows within the second channel 72 to the second outlet orifice 72$b$.

It should be noted that the inlet opening 82 is a tangential opening of the expansion member 8 with respect to a fourth extension axis A4 of the end piece 81, the fourth extension axis A4 preferably coinciding with the first extension axis A1. It should also be noted that the outlet opening 83 is coaxial with the fourth extension axis A4 of the end piece 81. It should also be noted that the first inlet orifice 71$a$ and the second outlet orifice 72$b$ are formed on a first face 73 of the attachment block 7 which is intended to be brazed to the end plate 30 of the heat exchanger 3. It should also be noted that the attachment block 7 comprises a second face 74, opposite the first face 73, and preferably parallel to the first face 73 via which the chamber 70 opens out.

In FIGS. 5 and 6, the first circulation pathway 41 of the refrigerant fluid 6 and the second circulation pathway 42 of the refrigerant fluid 6 inside the internal heat exchanger 4 are arranged in a U shape, inside a circulation plane P which is parallel to a plate plane P' in which either the end plate 30 of the heat exchanger 3, the end plate 40 of the internal heat exchanger 4 or the dividing plate 50 extends.

In FIG. 5, the first pass 31 of refrigerant fluid 6 inside the heat exchanger 3 and the second pass 32 of heat transfer liquid 5 inside the heat exchanger 3 are also arranged in a U shape, within the circulation plane P.

In FIG. 6, the first pass 31 of refrigerant fluid 6 inside the heat exchanger 3 and the second pass 32 of heat transfer liquid 5 inside the heat exchanger 3 are also arranged in an I shape, within the circulation plane P.

In FIG. 7, the thermal treatment module 1 is mainly formed by a plurality of plates 30, 301*a*, 301*b*, 302*a*, 302*b*, 40, 401, 402, 50, including the end plate 30 of the heat exchanger 3, the end plate 40 of the internal exchanger 4 and the dividing plate 50. Among the plates 30, 301*a*, 301*b*, 302*a*, 302*b*, 40, 401, 402, 50 are exchanger plates 301*a*, 301*b*, 302*a*, 302*b*, 401, 402 which are stacked one on top of the other, namely constituent exchanger plates 301*a*, 301*b*, 302*a*, 302*b* of the heat exchanger 3 and constituent exchanger plates 401, 402 of the internal heat exchanger 4.

In FIGS. 8 to 14, each plate 30, 301*a*, 301*b*, 302*a*, 302*b*, 40, 401, 402, 50 is arranged in a pan 500 delimited by a raised peripheral rim 501 which borders a bottom 502. The bottoms 502 of the exchanger plates 301*a*, 301*b*, 302*a*, 302*b*, 401, 402 and of the dividing plate 50 have a plurality of flanges 503, 505 which at least partially delimit a passage 504 for heat transfer liquid 5 or heat transfer fluid 6. These passages 504 are constituent parts of a header for heat transfer fluid or a header for refrigerant fluid. The raised peripheral edges 501 of two successive plates 30, 301*a*, 301*b*, 302*a*, 302*b*, 40, 401, 402, 50 are brazed to one another.

Figure 8:
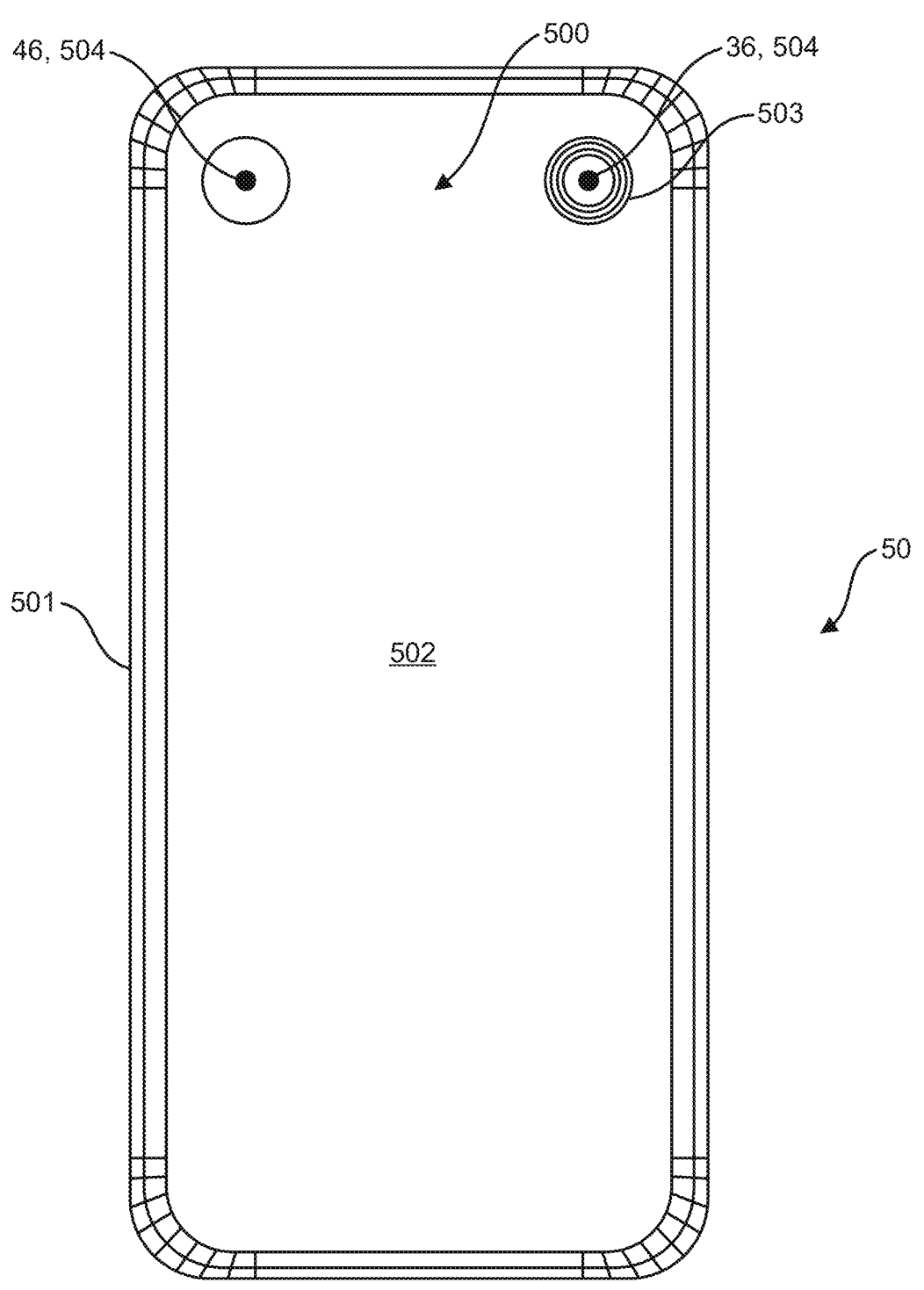

In FIG. 8, the dividing plate 50 has the second discharge orifice 46 and the first discharge orifice 36.

Figure 9:
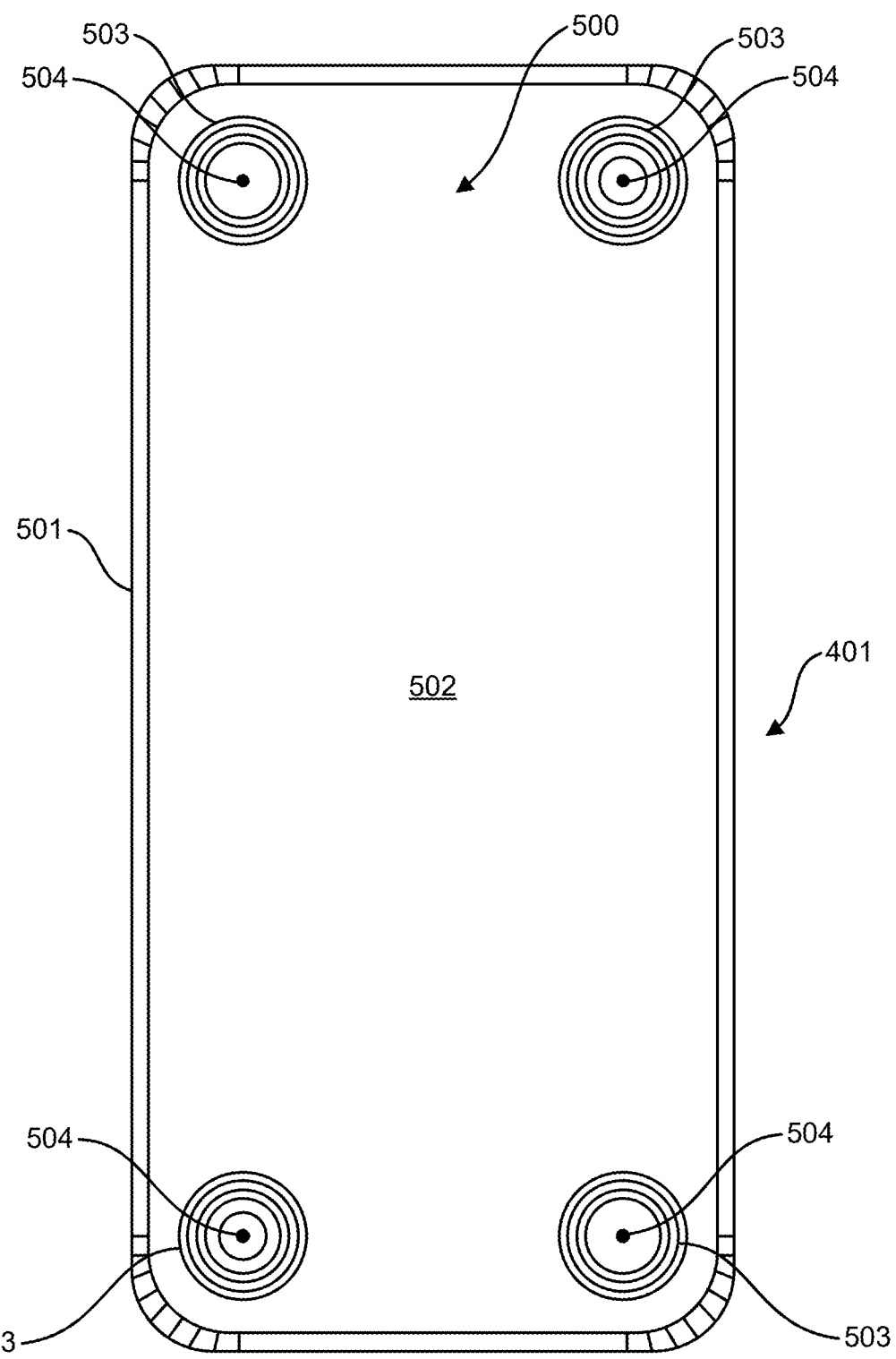
Figure 10:
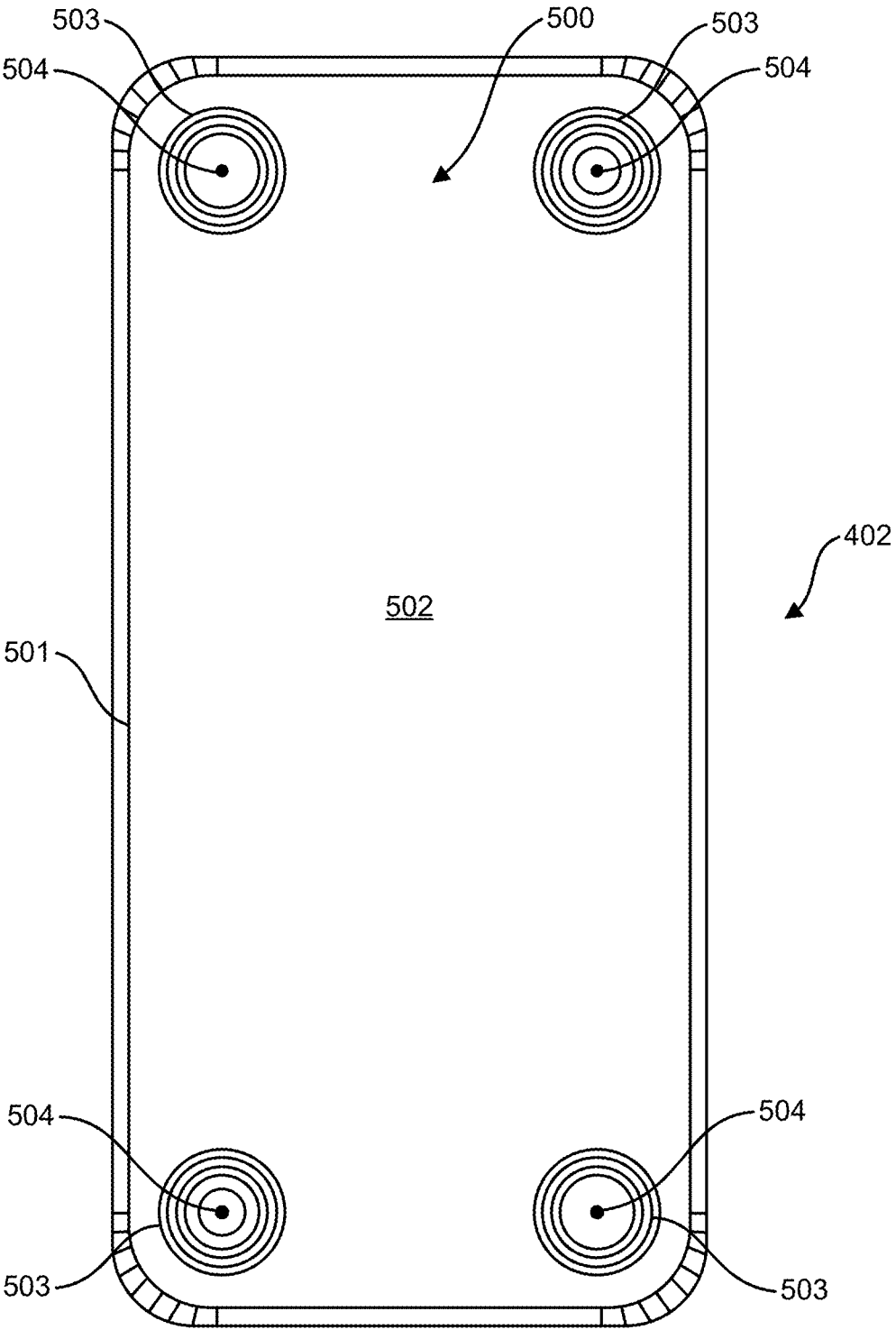

In FIG. 9, a constituent internal heat exchanger plate, of the first type, 401 of the internal heat exchanger 4 is intended to be interposed between two internal heat exchanger plates of the second type 402, illustrated in FIG. 10, which are also constituent parts of the internal heat exchanger 4. Similarly, a constituent internal heat exchanger plate, of the second type, 402 of the internal heat exchanger 4 is intended to be interposed between two internal heat exchanger plates of the first type 401. These internal heat exchanger plates 401, 402 delimit the circulation pathways 41, 42 of the refrigerant fluid 6 inside the internal heat exchanger 4 in pairs. They differ from one another notably by the shape of the flanges 503 delimiting the passages 504.

Figure 11:
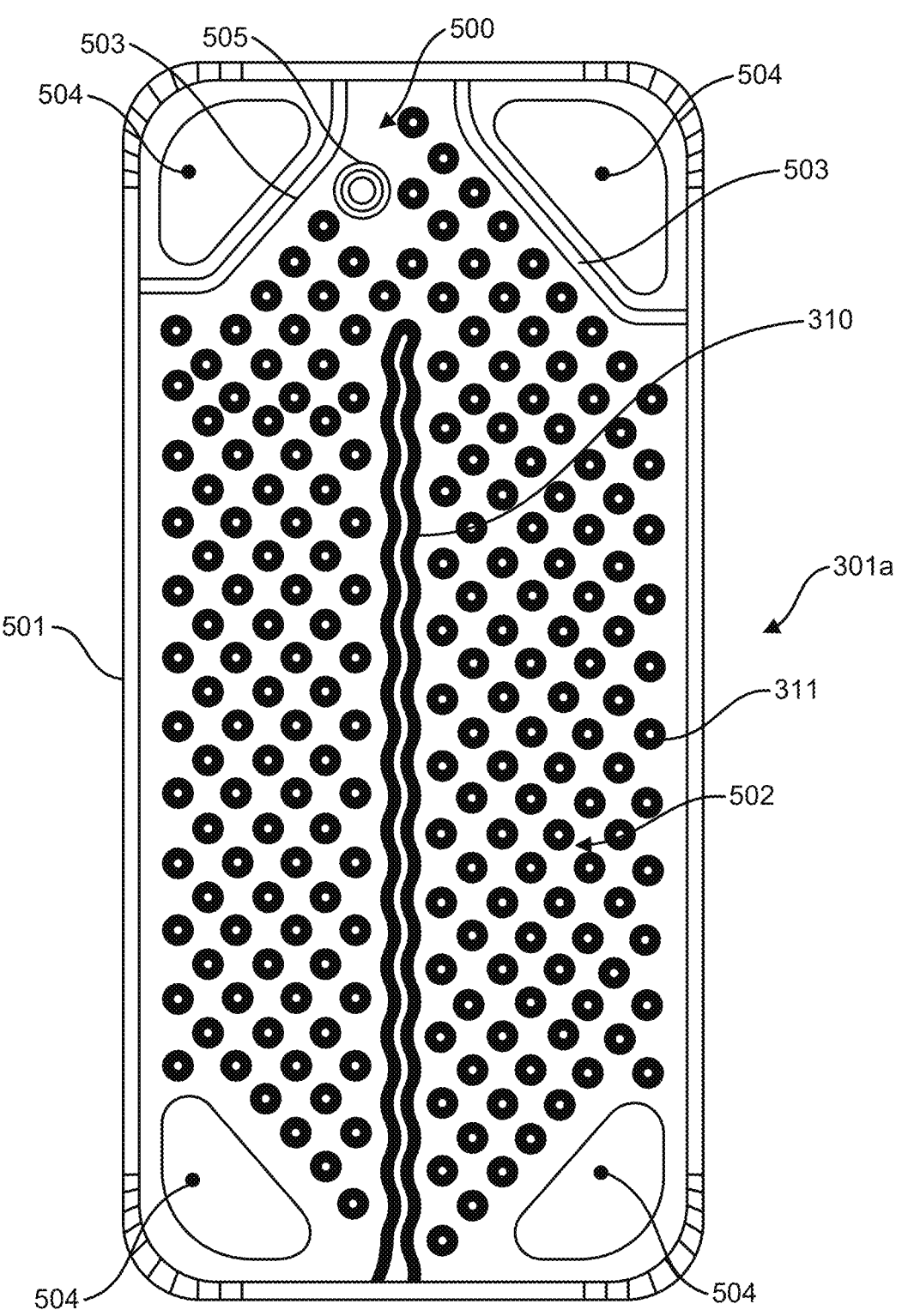
Figure 12:
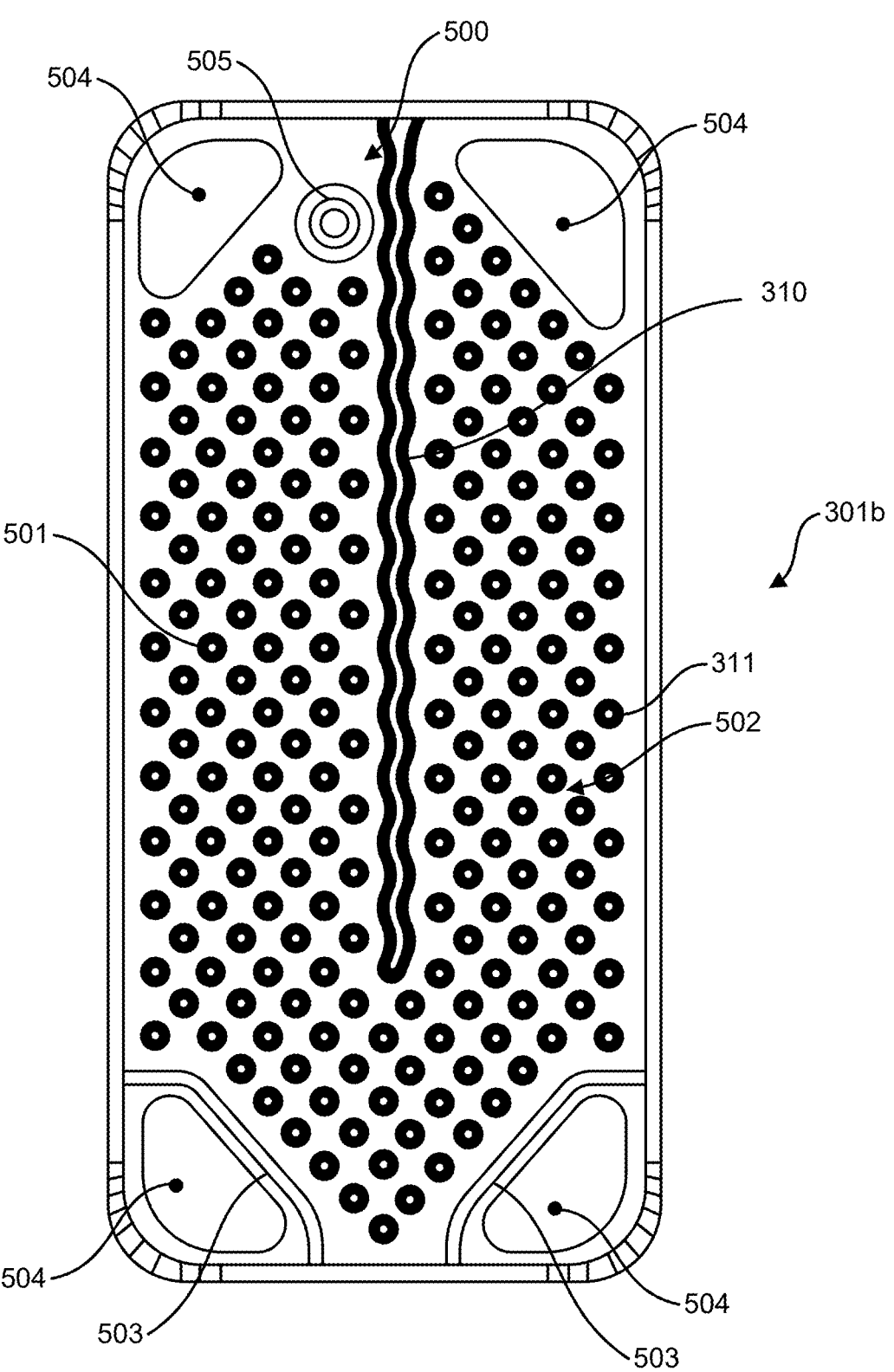

In FIG. 11, a constituent heat exchanger plate, of the first type, 301*a* of the heat exchanger 3 is intended to be interposed between two heat exchanger plates of the second type 301*b*, illustrated in FIG. 12, which are also constituent parts of the heat exchanger 3. Similarly, a constituent heat exchanger plate, of the second type, 301*b* of the heat exchanger 3 is intended to be interposed between two heat exchanger plates of the first type 301*a*. These heat exchanger plates 301*a*, 301*b* delimit the passes 31, 32 of the refrigerant fluid 6 or the heat transfer liquid 5 inside the heat exchanger 3 in pairs. In FIGS. 11 and 12, conveying flanges 505 made in one piece with the bottoms 502 of these plates are constituent parts of the conveying means 90 which is realized by a contiguous stack of conveying flanges 505 of successive plates.

Figure 13:
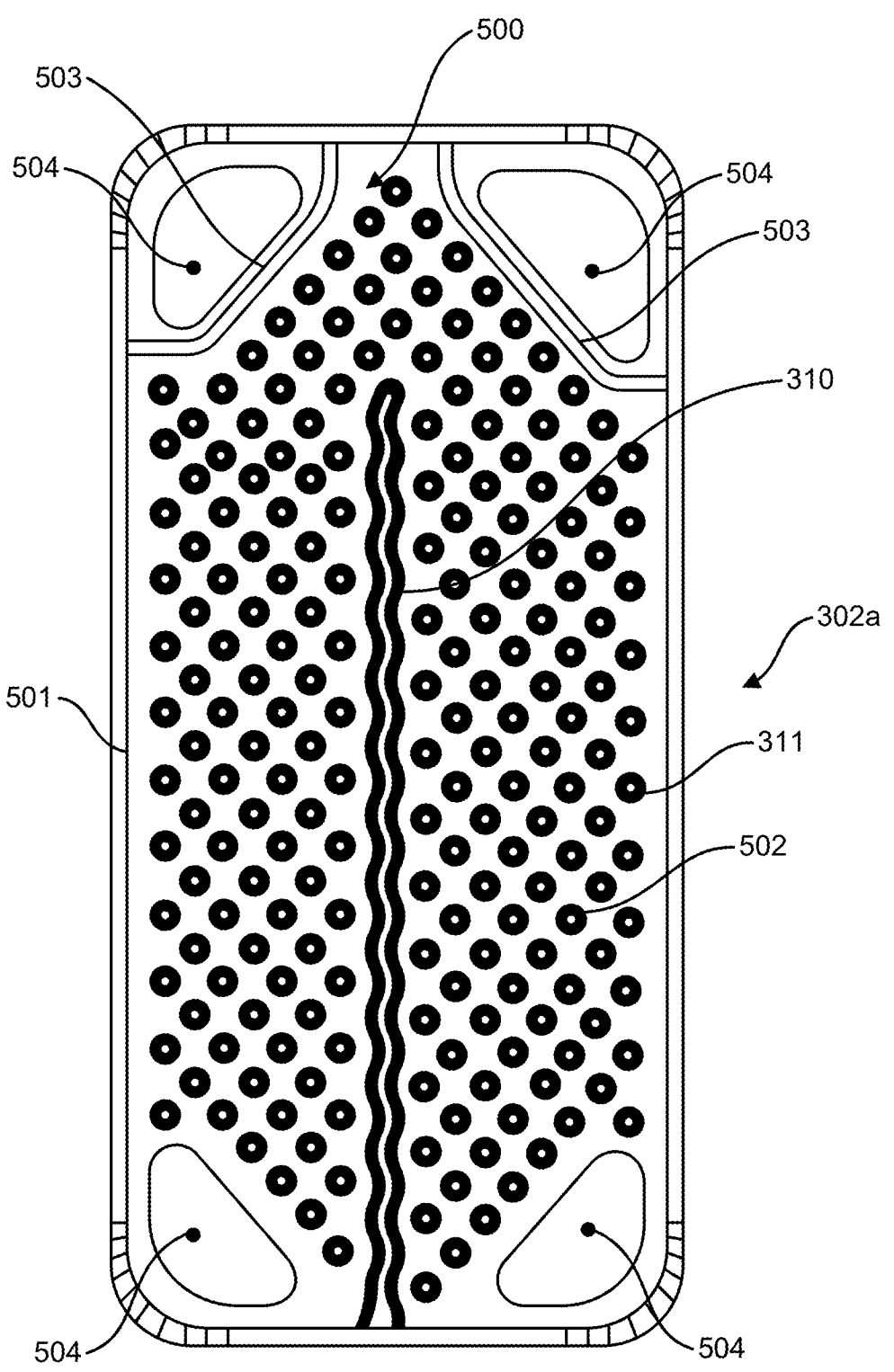
Figure 14:
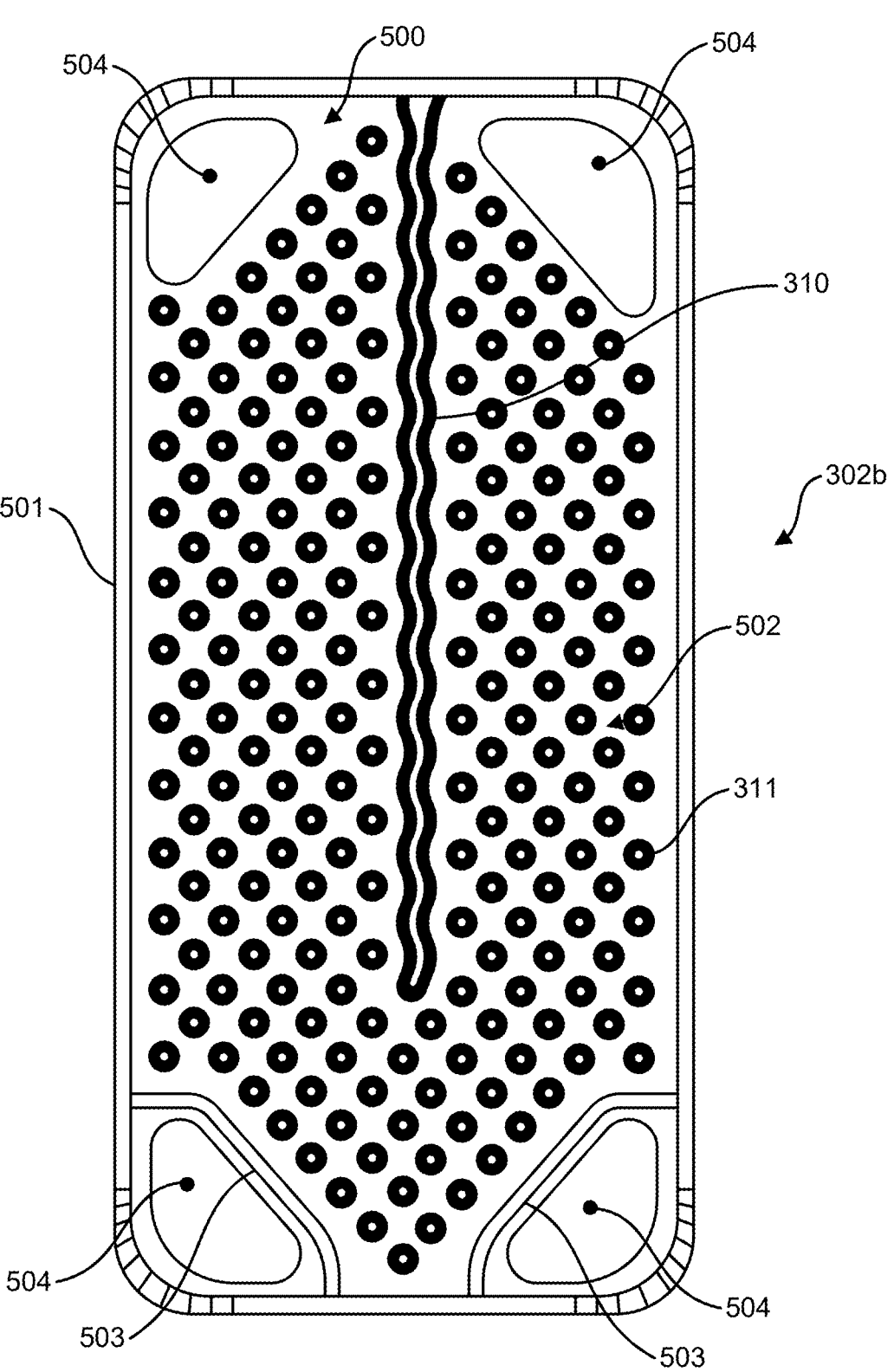

In FIG. 13, a constituent heat exchanger plate, of the third type, 302*a* of the heat exchanger 3 is intended to be interposed between two heat exchanger plates of the fourth type 302*b*, illustrated in FIG. 14, which are also constituent parts of the heat exchanger 3. Similarly, a constituent heat exchanger plate, of the fourth type, 302*b* of the heat exchanger 3 is intended to be interposed between two heat exchanger plates of the third type 302*a*. These heat exchanger plates 302*a*, 302*b* delimit the passes 31, 32 of the refrigerant fluid 6 or the heat transfer liquid 5 inside the heat exchanger 3 in pairs. In FIGS. 13 and 14, the bottoms of the plates do not have conveying flanges, the conveying means 90 being made up of the tube, not shown in these figures, which extends inside one of the passages 504, notably inside the passage located in the top-right corner of the plate, the surface area of which is greater than the surface areas of the other passages 504 of the same plate.

The presence of a central groove 310 formed in the bottoms 102 of the heat exchanger plates 301*a*, 301*b*, 302*a*, 302*b* to confer a U shape on the passes 31, 32 will be noted. The presence of flow-disturbing elements 311, which in the variant illustrated are formed by bosses made in the bottoms 102 of the heat exchanger plates 301*a*, 301*b*, 302*a*, 302*b* to disturb the flow of the refrigerant fluid 6 or the heat transfer liquid and improve the exchange of heat between them, will also be noted. According to another embodiment variant, the flow-disturbing elements 311 are formed by internal fins interposed between two contiguous heat exchanger plates 301*a*, 301*b*, 302*a*, 302*b*.

Figure 15:
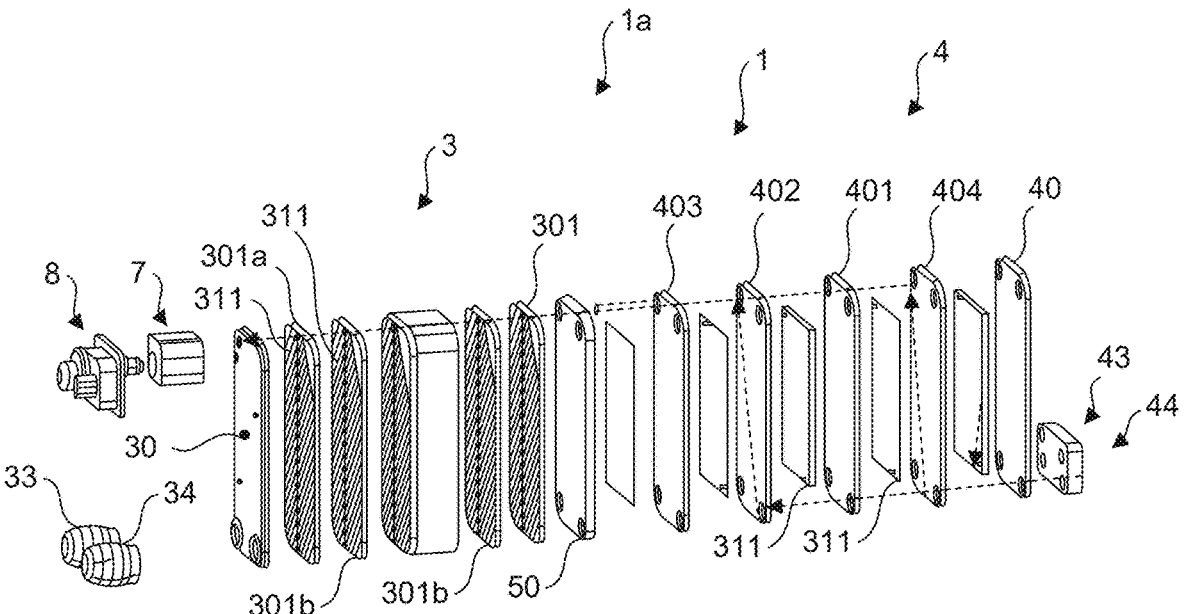

FIG. 15 shows the thermal treatment device 1*a* in an exploded view, which shows the expansion member 8 intended to be fitted to the attachment block 7, which itself is intended to be based on the end plate 30 of the heat exchanger 3. The heat exchanger 3 extends between the end plate 30 and the dividing plate 50, between which can be seen either alternating heat exchanger plates of the first type 301*a* and heat exchanger plates of the second type 301*b* or alternating heat exchanger plates of the third type 302*a* and heat exchanger plates of the fourth type 302*b*. The internal heat exchanger 4 extends between the dividing plate 50 and the end plate 40 of the internal heat exchanger 4 between which can be seen alternating internal heat exchanger plates of the first type 401 and internal heat exchanger plates of the second type 402. Flow-disturbing elements 311 formed by internal fins are interposed between an internal heat exchanger plate of the first type 401 and an internal heat exchanger plate of the second type 402. According to another variant, the flow-disturbing elements 311 are able to be formed by bosses made in the bottoms 502 of the internal heat exchanger plates of the first type 401 and/or of the internal heat exchanger plates of the second type 402. It should be noted that an internal heat exchanger plate of the third type 403 is interposed between said alternating heat exchanger plates 401, 402 and the dividing plate 50, the internal heat exchanger plate of the third type 403 differing from said heat exchanger plates 401, 402 by the absence of one of the four flanges 503 for shutting off one of the passages 504 and thus close the second circulation pathway 42. Similarly, an internal heat exchanger plate of the fourth type 404 is interposed between said alternating heat exchanger plates 401, 402 and the end plate 40, the internal heat exchanger plate of the fourth type 404 differing from said heat exchanger plates 401, 402 by the absence of one of the four flanges 503 for shutting off one of the passages 504 and thus close the first circulation pathway 41.

Of course, the invention is not limited to the examples that have just been described, and numerous modifications may be made to these examples without departing from the scope of the invention.

The invention, as has just been described, does indeed achieve its stated objective, and makes it possible to propose a thermal treatment module grouping together a heat exchanger, an internal heat exchanger and at least one attachment block intended to bear an expansion member. Variants that are not described here could be implemented without departing from the context of the invention, provided that, in accordance with the invention, they comprise a thermal treatment module according to the invention.

The invention claimed is:

1. A thermal treatment module for a thermal treatment system of a vehicle, the thermal treatment module comprising a heat exchanger and an internal heat exchanger, wherein the heat exchanger is configured to bring about an exchange of heat between a heat transfer liquid and a refrigerant fluid, wherein the internal heat exchanger is configured to bring about an exchange of heat between the refrigerant fluid subjected to two different temperature levels in the thermal treatment system, wherein the thermal treatment module comprises an attachment block at least secured to the heat exchanger and configured to bear an expansion member, wherein the heat exchanger is interposed between the internal heat exchanger and the attachment block, wherein the attachment block comprises at least one chamber and at least two channels, wherein a first channel of the two channels extends between a first inlet orifice and a first outlet orifice which opens onto the at least one chamber, and wherein a second channel of the two channels extends between a second inlet orifice which opens onto the at least one chamber and a second outlet orifice.

2. The thermal treatment module as claimed in claim 1, wherein the first inlet orifice and the second outlet orifice are formed on a first face of the attachment block which is in contact with an end plate of the heat exchanger.

3. The thermal treatment module as claimed in claim 2, wherein the heat exchanger comprises a conveying means for the refrigerant fluid which extends between the end plate of the heat exchanger and a dividing plate interposed between the heat exchanger and the internal heat exchanger.

4. The thermal treatment module as claimed in claim 3, wherein the conveying means comprises an inlet opening in fluidic communication with a first circulation pathway of the refrigerant fluid at a first temperature that the internal heat exchanger has and an outlet opening in fluidic communication with the first inlet orifice of the attachment block.

5. The thermal treatment module as claimed in claim 4, wherein the internal heat exchanger comprises a second circulation pathway of the refrigerant fluid at a second temperature which is configured to enable an exchange of heat with the first circulation pathway of the refrigerant fluid at a first temperature and extends between a second intake orifice in fluidic communication with a first discharge orifice and a discharge opening for discharging refrigerant fluid from the internal heat exchanger, the first circulation pathway extending between an intake opening for admitting refrigerant fluid and a second discharge orifice in fluidic communication with the inlet opening of the conveying means.

6. The thermal treatment module as claimed in claim 5, the thermal treatment module comprising a plurality of plates, including the end plate of the heat exchanger and an end plate of the internal exchanger, which is provided with the intake opening for admitting refrigerant fluid and the discharge opening for discharging refrigerant fluid, between which are interposed the dividing plate and exchanger plates which are stacked one on top of another, wherein each plate is arranged in a pan delimited by a raised peripheral rim which borders a bottom, wherein the bottoms of the exchanger plates and of the dividing plate having a plurality of flanges at least partially delimit a passage for heat transfer liquid or heat transfer fluid, wherein the raised peripheral rims of two successive plates are brazed to one another.

7. The thermal treatment module as claimed in claim 3, wherein the heat exchanger comprises:

a first pass, which is configured for flow through by the refrigerant fluid and extends between a first intake orifice in fluidic communication with the second outlet orifice of the attachment block and a first discharge orifice formed through the dividing plate, and a second pass, which is configured for flow through by the heat transfer liquid and extends between an intake opening through which the heat transfer liquid is admitted to the heat exchanger and a discharge opening for discharging heat transfer liquid from the heat exchanger.

8. A thermal treatment device comprising a thermal treatment module as claimed in claim 1 and an expansion member fitted to the attachment block via attachment means.

9. A thermal treatment system of a vehicle, comprising the thermal treatment device as claimed in claim 8, wherein the thermal treatment system comprises a heat-transfer liquid circuit within which the heat transfer liquid circulates, the heat-transfer liquid circuit comprising at least one pump and one heat exchanger configured to exchange heat with an electrical energy storage device, and wherein the thermal treatment system comprises a refrigerant fluid circuit within which the refrigerant fluid circulates, the refrigerant fluid circuit comprising at least one compressor, one condenser, one expansion device, and one evaporator.

* * * * *